J. J. ODENWALD.
COMBINED SWITCH BOX AND SUPPORT.
APPLICATION FILED FEB. 19, 1910.
963,315.
Patented July 5, 1910.
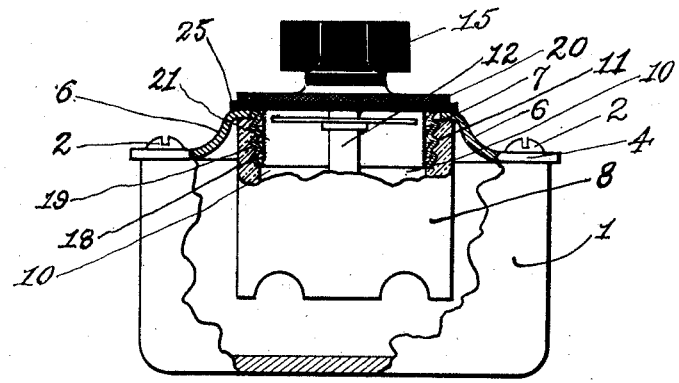
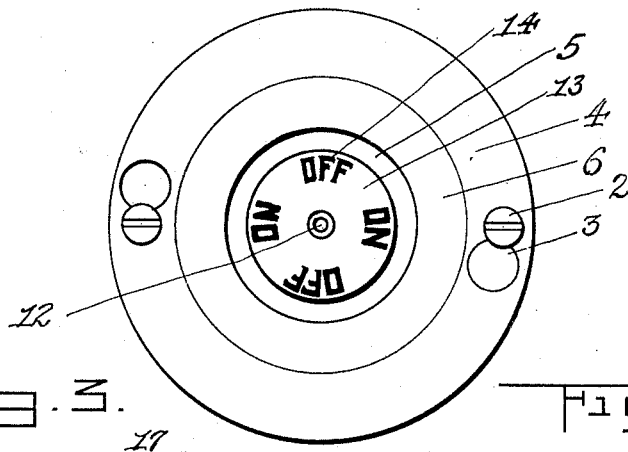
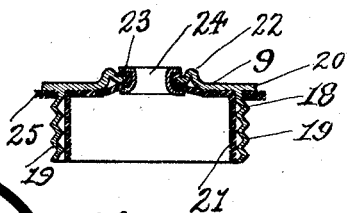
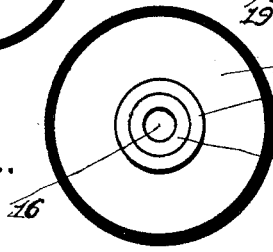
Witnesses
Inventor
John J. Odenwald
by N. Louis Bogan
Attorney

UNITED STATES PATENT OFFICE.

JOHN J. ODENWALD, OF WASHINGTON, DISTRICT OF COLUMBIA, ASSIGNOR OF ONE-HALF TO JULIUS LANSBURGH AND IRVIN H. HOLLANDER, BOTH OF WASHINGTON, DISTRICT OF COLUMBIA.

COMBINED SWITCH-BOX AND SUPPORT.

963,315.   Specification of Letters Patent.   Patented July 5, 1910.

Application filed February 19, 1910. Serial No. 544,838.

*To all whom it may concern:*

Be it known that I, JOHN J. ODENWALD, a citizen of the United States, residing at 713 Eleventh street northwest, Washington, in the District of Columbia, have invented certain new and useful Improvements in Combined Switch-Boxes and Supports, of which the following is a specification.

This invention relates to a combined switch box and support or suspension means therefor, and the object thereof is to provide a switch box in combination with a suspension means therefor in a manner as hereinafter set forth, whereby the fixedly mounting of the switch box in position will be vastly facilitated over the mode now in general use.

In wiring houses and other buildings for electric lights, it is at present necessary, in order to meet the requirements of modern insurance and municipal regulations, to inclose the conducting wires in tubes, which lead through the walls and ceilings of the buildings into terminal or outlet boxes, where connections are made with the switch block or box. Generally the switch block or box has been secured to the outlet box by hold-fast devices extending through the cover or through the bottom and in some instances through the side of the outlet box and engaging in the switch base or block for fixedly securing the latter in the outlet box. This generally requires the tapping of the cover, bottom or side of the outlet box causing thereby inconvenience as well as a loss of time. To overcome the foregoing objection and to provide a convenient manner for the fixedly securing of the switch box in position without the employment of hold-fast devices, such as screws, bolts and rivets, is the essential object of this invention. Although the construction is designed primarily for use in connection with outlet boxes, to overcome the inconvenience and loss of time due to the tapping and the employment of varying length hold-fast devices for engagement with the switch block for fixedly securing the latter in position, yet it is to be understood that the construction can be used for any purposes wherein it is found applicable, that is to say, where it is desired to mount a switch box fixedly in position.

Further objects of the invention are to provide a switch box for use in connection with the form of outlet boxes now in general use and which is simple in its construction, strong, durable, conveniently set up, efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown one form of the embodiment of the invention, but it is to be understood, that changes, variations and modifications can be resorted to, which come within the scope of the claims hereunto appended.

In the drawings wherein like reference characters denote corresponding parts throughout the several views: Figure 1 is a sectional elevation showing the adaptation of a switch box in accordance with this invention in connection with the cover of a known construction of outlet box, Fig. 2 is a top plan view with the cap of the switch box and also the switch button removed, Fig. 3 is a top plan of the switch box cap, Fig. 4 is a cross sectional view of the switch box cap, and Fig. 5 is a plan of a modified form of a switch box cap.

Referring to the drawings in detail, 1 denotes the body portion of an outlet box, which is provided with a pair of screws 2 adapted to extend through key hole shaped openings 3 formed in the margin of the cover 4 of the outlet box. The cover 4 is formed with a centrally-disposed opening 5 and the material surrounding said opening 5 is struck up to provide a bead 6 which terminates in an annular flange 7, the inner face of which constitutes an abutment for the outer end of the body portion of the switch box to be presently referred to. The construction of outlet box, as referred to is that now in general use.

The switch box comprises a body portion 8 and a cap 9. The body portion 8 is constructed of suitable insulating material and is cut away to provide a chamber 10 having the wall thereof formed throughout with a left thread 11. The elements of the switch connected to and mounted in the switch box may be of any suitable construction, as shown however and by way of example one of the elements is a turning post 12 carrying a disk 13 provided with "on" and "off" indications, as at 14, which are visible through the cap of the switch box. The disk 13 is fixed to the post 12 and moves therewith. The outer end of the post 12 is provided with a button 15. The cap 9 is constructed of suitable material, preferably metal and has its top formed with an opening 16 for the passage of the post 12 and furthermore provided with a slot 17, so that the "on" and "off" indications can be read when occasion so requires. The body portion of the cap 9 is indicated by the reference character 18 and is formed throughout with a left thread 19. The diameter of the body portion 18 of the cap with respect to the diameter of the body portion 8 of the switch box is such, that the body portion 18 can extend into the body portion 8 and engage the threads 11, whereby the cap 9 will be secured to the body portion 8. The diameter of the body portion 18 of the cap is less than the diameter of the top of the cap, whereby on outwardly-extending flange 20 will be provided for a purpose to be presently referred to. The cap 9 is provided with an insulating lining 21, which engages the edge of the opening 16 and the cap 9 is furthermore provided with an annular ridge 22, which surrounds an insulating washer 23 mounted upon the outer face of the cap and which is maintained in position by an eyelet 24, the latter furthermore maintaining in position the insulating lining 21 against the edge of the opening 16, the insulating lining 21 abutting against the washer 23. Surrounding the body portion 18 of the cap and abutting against the lower face of the flange 20 is a resilient washer 25.

The manner of assembling the switch box with respect to the cover of the outlet box, so as to fixedly secure the switch box in position without the employment of hold-fast devices, such as screws, bolts and rivets, is as follows: The outer end of the body portion 8 of the switch box is positioned against the inner face of the flange 7, the button 15 having been removed from the post 12. The cap 9 with the washer 25 is then inserted through the opening 5 of the cover 4 and is connected to the body portion 8 by the engagement of the threads of the cap with the threads of the body portion 8. The cap is screwed into the body portion 8 until the washer 25, is held tightly against the outer face of the flange 7. By this arrangement the switch box is fixedly secured to the cover of the outlet box, as well as being suspended within the outlet box, after the outlet box cover is connected in position. When the switch box is fixedly secured in position sufficient space is provided in the outlet box for the necessary connections between the switch and the wires without crowding. After the switch box is secured in position in the manner as stated, the button 15 is mounted upon the post 12.

By providing a left thread connection between the cap and body portion of the switch box, a binding action will always be set up when the post 12 is turned, for the reason that the post turns to the right and which will prevent any possibility of the elements of the switch box unscrewing during the turning of the post, as the post is carried by the body portion of the switch box and it is obvious that if the turning movement of the post should have a tendency to shift the body portion of the switch box, that such shifting movement would cause a tighter connection between the cap and the body portion 8 or in other words when the post 12 is turned the elements of the switch box will not tend to separate, but bind more firmly.

In Fig. 5 of the drawings a modified form of cap is shown and which is indicated by the reference character 26. The difference between the cap shown in Fig. 5 and that shown in Figs. 3 and 4, is that in Fig. 5 the slot 17 is dispensed with and suitable "on" and "off" indications are provided upon the outer face of the top of the cap.

What I claim is:—

1. The combination with a support provided with a centrally disposed opening, of a switch box comprising a body portion and a cap, said body portion abutting against the inner face of said support and provided with interior threads, said cap provided with exterior threads and a flange, said cap extending through said opening and engaging the threads of said body portion and having its flange arranged exteriorly of said support, whereby said switch box will be coupled to and suspended by said support.

2. The combination with a support provided with a centrally disposed opening, of a switch box comprising a body portion and a cap, said body portion abutting against the inner face of said support and provided with interior threads, said cap provided with exterior threads and a flange, said cap extending through said opening and engaging the threads of the body portion and having its flange arranged exteriorly of said support, whereby said switch box will be coupled to and suspended by said support, and a washer interposed between said flange and said support.

3. A switch box comprising a body portion having its inner face provided throughout with a left thread, a cap comprising a body portion and a top, said body portion of the cap formed throughout with exterior left threads adapted to engage the threads of the body portion of the switch box whereby said cap and body portion will be coupled together, said body portion of said cap of less diameter than the top of the cap whereby the cap will be formed with an outwardly-extending flange for engagement with a support for coupling the switch box in position.

4. A switch box comprising a body portion having its inner face provided throughout with a left thread, a cap comprising a body portion and a top, said body portion of the cap formed throughout with exterior left threads adapted to engage the threads of the body portion of the switch box whereby said cap and body portion will be coupled together, said body portion of said cap of less diameter than the top of the cap whereby the cap will be formed with an outwardly-extending flange for engagement with a support for coupling the switch box in position, and a washer surrounding the body portion of the cap and abutting against the inner face of the flange of the cap.

5. The combination with the cover of an outlet box, of a switch box body portion abutting against the inner face of said cover and provided with interior threads, a switch box cap provided with a flange and exterior threads, said cap extending through said cover and engaging the threads of said body portion and further having its flange arranged exteriorly of the cover whereby when the cap is in engagement with the body portion the switch box will be coupled to and suspended by the outlet box cover.

6. The combination with the cover of an outlet box, of a switch box body portion abutting against the inner face of said cover and provided with interior threads, a switch box cap provided with a flange and exterior threads, said cap extending through said cover and engaging the threads of said body portion and further having its flange arranged exteriorly of the cover whereby when the cap is in engagement with the body portion, the switch box will be coupled to and suspended by the outlet box cover, and a washer interposed between the flange of said cap and the outer face of said outlet box cover.

7. The combination with the cover of an outlet box, of a switch box body portion abutting against the inner face of said cover and provided with interior left threads, a switch box cap provided with a flange and exterior left threads, said cap extending through said cover and engaging the threads of said body portion and further having its flange arranged exteriorly of the cover whereby when the cap is in engagement with the body portion, the switch box will be coupled to and suspended by the outlet box cover, and a washer interposed between the flange of said cap and the outer face of said outlet box cover.

In testimony whereof I affix my signature in presence of two witnesses.

JOHN J. ODENWALD.

Witnesses:
N. LOUIS BOGAN,
T. K. BRYANT.